United States Patent
Christiansen

(10) Patent No.: US 7,352,481 B2
(45) Date of Patent: Apr. 1, 2008

(54) SYSTEMS AND METHODS FOR RECOVERY OF A FAILED RASTER IMAGE PROCESSOR PARTITION

(75) Inventor: Robert Douglas Christiansen, Boise, ID (US)

(73) Assignee: Hewlett-Packard Develepment Company, L.P., Houston, TX (US)

(*) Notice: Subject to any disclaimer, the term of this patent is extended or adjusted under 35 U.S.C. 154(b) by 983 days.

(21) Appl. No.: 10/394,970

(22) Filed: Mar. 21, 2003

(65) Prior Publication Data

US 2004/0184061 A1   Sep. 23, 2004

(51) Int. Cl.
G06F 3/12 (2006.01)
G06K 15/00 (2006.01)

(52) U.S. Cl. ..................... 358/1.13; 358/1.14
(58) Field of Classification Search ............... 358/1.13, 358/1.1, 1.9, 1.15, 1.14
See application file for complete search history.

(56) References Cited

U.S. PATENT DOCUMENTS 6,978,416 B2* 12/2005 Widmer ....................... 714/800
2004/0095596 A1* 5/2004 Rijavec ....................... 358/1.15

* cited by examiner

Primary Examiner—Douglas Q. Tran

(57) ABSTRACT

In a raster image processing (RIP'ing) pipeline, the invention recovers a failed raster image process (RIP) partition. In one aspect, multiple partitions of a print job are distributed across multiple RIP engines. One or more particular partitions of the multiple partitions are determined to have failed to RIP. Other ones of the multiple partitions that are not the one or more failed partitions were successfully raster image processed (RIP'd) into a first set of data. Zero (0) or more portions of erroneous print data portions of the one or more particular portions are automatically identified. If no portions of the one or more particular portions are determined to be erroneous, a second set of RIP'd data corresponding to the one or more particular portions is automatically generated. The first and second sets of RIP'd data are aggregated into an output file for printing.

21 Claims, 3 Drawing Sheets

SYSTEMS AND METHODS FOR RECOVERY OF A FAILED RASTER IMAGE PROCESSOR PARTITION

TECHNICAL FIELD

The invention relates to the printing field.

BACKGROUND

Raster image processing (RIP'ing) is the process of translating digital vector image data into bit-mapped image data or raster bits for rendering. Such vector image data is generally expressed in Page Description Language (PDL) such as Printer Control Language® (PCL), Portable Document Format (PDF), or PostScript® (PS). In the printing field, one or more hardware and/or software implemented raster image process (RIP) engines are commonly used by print shops to RIP large print jobs or documents for printing on a printing press. Hereinafter, a RIP engine is often referred to as a RIP resource. When one or RIP resources, which may be implemented across any number of computing devices, are configured to work on a particular print job the RIP resources are collectively referred to as a pipeline.

When using several RIP engines to RIP a single print job, the print job may be divided into multiple partitions. Each partition is a piece of the print job that is operated on by a respective RIP engine in the pipeline. During the RIP'ing process, a RIP engine may fail to successfully RIP a particular partition. The particular partition may fail to RIP, for example, when the RIP engine has a temporary or permanent malfunction (e.g., a power outage, an environmental malfunction, etc.). Responsive to such a failure, existing techniques require that entire print job to be re-submitted and re-RIP'd. This requires administrative intervention to resubmit the failed print job and also requires all of the processing and memory resources that were initially required to attempt to RIP the print job. Since such failures are generally unanticipated, these types of failures can substantially disrupt the workflow in a print shop.

Additionally, if any one or more of the partitions in a print job contains a serious syntactical or structural error(s), the RIP'ing process may fail and the entire print job must be pulled off the pipeline to manually locate and correct the error(s) of the faulty partition(s) before the entire print job is resubmitted for RIP'ing. This is a time consuming, labor intensive, and computer processing resource intensive process because a single partition may represent hundreds or thousands of pages of PDL. Thus, locating a syntactical and/or structural error(s) in a failed print job is a labor intensive and time consuming activity for administrators.

Even after such an error is located, the entire print job must be resubmitted to the print shop for re-RIP'ing. Since print shop workflow typically changes over time, a pipeline may or may not be available at the time for re-RIP'ing the print job. Additionally, even if the RIP'ing resources are available, the resources may need to be moved from other pipeline(s) and reconfigured based on the attributes of this particular print job. For these reasons, faulty print jobs can not only be inconvenient, but they can also be substantially time consuming, labor intensive, and expensive to correct. Techniques to overcome the time, labor, and cost generally experienced due to faulty print jobs are greatly desired.

SUMMARY

In a raster image processing (RIP'ing) pipeline, the invention recovers a failed raster image process (RIP) partition. In one aspect, multiple partitions of a print job are distributed across multiple RIP engines. One or more particular partitions of the multiple partitions are determined to have failed to RIP. Other ones of the multiple partitions that are not the one or more failed partitions were successfully raster image processed (RIP'd) into a first set of data. Zero (0) or more portions of erroneous print data portions of the one or more particular portions are automatically identified. If no portions of the one or more particular portions are determined to be erroneous, a second set of RIP'd data corresponding to the one or more particular portions is automatically generated. The first and second sets of RIP'd data are aggregated into an output file for printing.

BRIEF DESCRIPTION OF THE DRAWINGS

The detailed description is described with reference to the accompanying figures.

DETAILED DESCRIPTION

Figure 1:
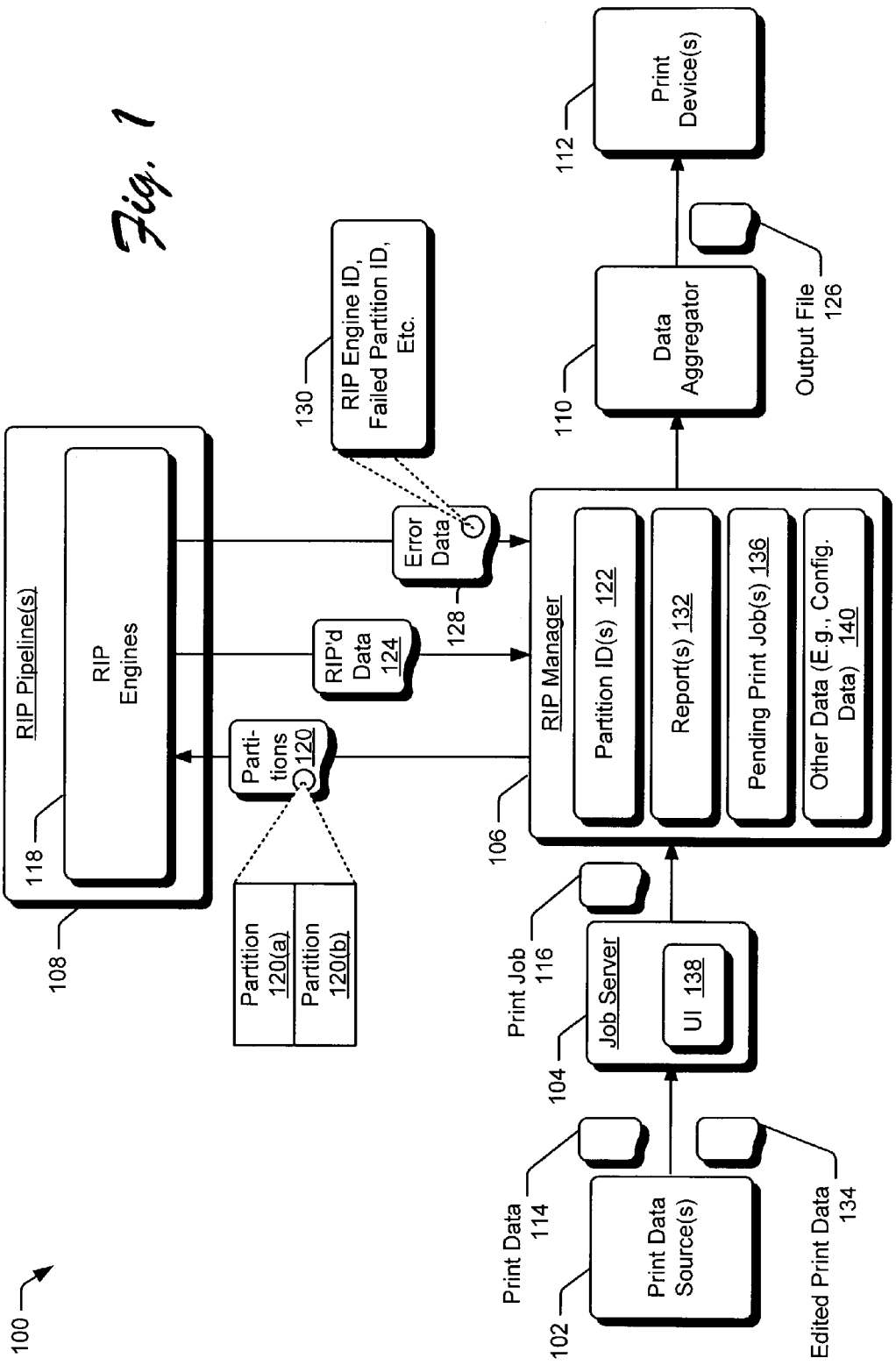
FIG. 1 is an exemplary suitable computing environment within which systems, apparatuses and methods for recovery of a failed RIP partition may be implemented. A failed RIP partition is a portion of a print job that has failed to RIP, for example, because of syntactical and/or structural errors in corresponding print data (e.g., PDL).

Turning to the drawings, wherein like reference numerals refer to like elements, the invention is illustrated as being implemented in a suitable computing environment. FIG. 1 is an exemplary suitable computing environment 100 within which systems, apparatuses and methods to automatically recover a failed raster image processor partition may be implemented. Exemplary computing environment 100 is only one example of a suitable computing environment and is not intended to suggest any limitation as to the scope of use or functionality of systems and methods the described herein.

Although not required, the invention will be described in the general context of computer-executable instructions, such as program modules executed in a distributed computing environment by a computer. Program modules generally include routines, programs, objects, components, data structures, etc., that perform particular tasks or implement particular abstract data types. In a distributed computing environment, program modules may be located in both local and remote memory storage devices.

As shown in FIG. 1, the exemplary computing environment 100 includes print data source 102, job server 104, RIP manager 106, one or more RIP pipelines 108, raster imaged processed ("RIP'd") partition aggregator 110, and one or more print device(s) 112, each of which are now described. The job server 104 receives, uploads, or otherwise accesses print data 114 from a print data source 102. Print data is expressed in PDL and is authored using standard authoring tools. A print data source can be local or remote to the exemplary computing environment 100. A local data source may consist of any combination of a stand alone computing device and/or volatile/non-volatile computer storage media that is coupled to the job server. Remote or external data source(s) are coupled to the job server over a network (not shown) such as the Internet.

The job server 104 generates a print job 116 from the print data 114. This is accomplished using any combination of known automated and/or administrator directed techniques for generating print jobs from print data. A print job includes, for example, the print data, an analysis of the complexity of the print data, page size, associated color spaces, etc. The job server provides this information to the RIP manager via the print job 116.

Each RIP pipeline 108 includes multiple RIP engines 118 for translating or "ripping" the vector image data expressed in the print job 114 into bitmapped data, which is represented in FIG. 1 as RIP'd data 124. The information in a print job 116 is used by the RIP manager 106 to assign particular portions of the print job to respective RIP engines 118 in a RIP pipeline 108 for RIP'ing. In particular, the RIP manager 106 utilizes the information to divide the encapsulated print data 114 into multiple partitions 120. The number of partitions that the print data is divided into is a function of print data size, the availability of RIP resources in one or more pipelines 108 to process the print job, and/or other print shop workflow criteria. Thus, a partition may include just about any number of pages of print data (e.g., tens, hundreds, or thousands of pages of print data).

While generating partitions 120, the RIP manager 106 also assigns a substantially unique partition identifier (ID) 122 to each partition. The partition IDs allow for differentiation of one partition from another. As a RIP engine RIPs a partition, the partition's partition ID is transferred to the partition's RIP'd data 124. When all of a print job's print data has been successfully RIP'd, the partition IDs are used by the data aggregator 110 to sort multiple blocks of RIP'd data 124 into a correct print data order.

The sorting operation is performed because partitions 120 will not necessarily complete RIP'ing in the same order that they are represented in the print job 116. One reason for this is because respective partitions are assigned to different RIP engines 118 for processing. The speed at which any one RIP engine completes processing is typically a function of many different variables such as available processing, memory, and data storage resources. Another reason is because one or more partitions may be erroneous requiring subsequent correction and merging with data from previously successfully RIP'd partitions. Thus partitions may be RIP'd in various orders that are not necessarily representative of the order of the partition ordering in the print job.

The RIP manager 106 distributes partitions 120 across the RIP engines 118 in the pipeline 108. Partition distribution may be based on any number of different criteria such as resource availability, partition size, current and/or anticipated print shop workflow, and so on. Responsive to receiving a respective partition, a RIP engine attempts to RIP the partition. If the partition is successfully RIP'd, the RIP engine communicates corresponding RIP'd data 124 to the RIP manager. Each successfully RIP'd partition 120 will have a corresponding set of RIP'd data 124.

For example, if after successfully RIP'ing all of the print data in a print job 116, including increasing the number of partitions 120 while searching for erroneous portions of a failed partition as described below, the number of partitions is N, then there will be N corresponding blocks of RIP'd data 124.

When the RIP manager 106 receives a block of RIP'd data 124, the RIP'd data is forwarded to the data aggregator 110 for subsequent sorting with respect to other blocks of RIP'd data and eventual aggregation into the output file 126 for printing by the print device(s) 112.

During the RIP'ing process, a RIP engine 118 may fail to successfully RIP a particular partition 120. The particular partition may fail to RIP, for example, when the RIP engine has a temporary or permanent malfunction (e.g., power outage, an so on). Responsive to such a failure, existing techniques require that entire print job to be re-submitted and re-RIP'd. This requires administrative intervention to resubmit the failed print job and also requires all of the processing and memory resources that were initially required to attempt to RIP the print job. Since such failures are generally unanticipated, these types of failures can substantially disrupt the workflow in a print shop. In contrast to such existing techniques in such a situation, and as described below, the systems, apparatus, and methods of the exemplary computing system 100 will automatically recover the failed RIP partition by re-RIP'ing the failed partition without requiring any administrative correction and without needing to re-RIP the entire print job.

Another reason that a partition 120 may fail to RIP is when the partition is syntactically and/or structurally inaccurate. Recall that existing techniques do not narrow down which portions of the partition are erroneous (a partition often consist of thousands of pages of PDL), and also require that entire print job to be re-submitted and re-RIP'd responsive to such a failure. In contrast to such existing techniques, the systems, apparatus, and methods of the exemplary computing system 100 performs iterative binary searches of the failed partition(s) to identify specific portions of the failed partition that comprise erroneous print data. The granularity of the erroneous portion identification procedure is configurable so that different variables such as workflow, desired degrees of certainty, and so on, can be taken into consideration.

The erroneous portions of a failed partition are identified in a published report 132. The information in the report substantially reduces that amount of time and labor that would otherwise be required of an administrator to locate and correct the print data that caused the RIP'ing failure. The RIP manager 106 maintains the failed print job as a pending print job 136. Once an administrative entity has corrected those portions of the pending print job that caused the failure, the corrected portions are resubmitted to the job server and re-RIP'd. Successfully RIP'd data 124 corresponding to the corrected portions is merged into the pending print job so that the entire print job does not need to be re-submitted for RIP'ing. This technique substantially reduces that costs and time that are otherwise generally required of existing techniques to correct and re-RIP a print job that has one or more partitions that failed to RIP.

To recover a failed RIP partition, the RIP manager 106 must first determine that a particular partition 120 has failed to RIP. In one implementation, passage of a configurable certain amount of time without receiving, by the RIP manager, RIP'd data 124 corresponding to a particular partition 120 can indicate failure to RIP the particular partition. Such a configurable amount of time can be indicated in configuration data stored, for example, in other data 140 of FIG. 1.

In another implementation, a RIP engine 118 generates and communicates error data 128 to the RIP manager responsive to encountering a partition that includes syntactically and/or structurally erroneous print data. Such error data includes, for example, at least a RIP engine identifier (ID) for mapping by the RIP manager to the particular partition 120 that was distributed to the RIP engine. In another implementation, the error message includes at least a failed partition ID 130, to uniquely identify the particular partition that failed to RIP. In other implementations, the error data can further include additional data (not shown), for example, the time of failure, the pipeline name, and so on.

A partition 120 that has failed to RIP can contain any amount of PDL. Additionally, although the partition failed to RIP because of a particular erroneous portion of the partition, other parts of the partition may also turn out to be erroneous. In light of this and to reduce the amount of administrative time and labor that would otherwise be required to find any erroneous portions(s) of the failed partition, the RIP manager 106 performs an automatic and recursive procedure to narrow down the amount of PDL that needs to searched by an administrator to identify each of the at least one erroneous portions for corrective action such as editing or replacement. To this end, the RIP manager performs an iterative binary search of the failed partition to identify each of the at least one erroneous portions.

The RIP manager 106 performs an iterative binary search by splitting a failed partition 120 into respective first and second partitions 120. (All partitions of a current or pending print job are collectively represented via partitions 120). The RIP manager ensures that a substantially unique partition ID 122 is assigned to each respective first and second partition.

In one implementation, for instance, one of the first or second partitions 120 retains the partition ID 122 that was originally assigned to a detected failed partition. The other of the first and second partitions is provided with a new partition ID. In another implementation, both first and second partitions are provided with partitions IDs that are both different from the detected failed partition's partition ID; the failed partition's ID being removed from the list of active partition IDs in the print job 116. The first and second partitions are then sent to respective RIP engines for re-RIP'ing to either successfully RIP (e.g., when the failed RIP partition was due to a temporary or permanent RIP engine failure) or to more particularly identify the portions of the first and/or second partitions that are erroneous (e.g., syntactically and/or structurally incorrect).

For purposes of discussion, any of the first and second partitions 120 that failed to RIP is a respective failed partition. Whereas, any of the first and second partitions that is successfully RIP'd is a non-failed partition. RIP'd data 124 corresponding to non-failed partitions is communicated by the corresponding RIP engine 118 to the RIP manager 106. At this point, if both of the first and second partitions are successfully RIP'd and the initial failed partition was probably due to some temporary hardware and/or software malfunction in the exemplary computing system 100. When this is the case, the automatic process to recover the failed RIP partition is complete after the RIP manager communicates RIP'd data for the successfully RIP'd partitions to data aggregator 110 for combining in sorted order into output file 126 for printing at print device(s) 112.

However, if one or both of the first and second partitions 120 fail to RIP, then the initial failed partition 120 (i.e., the parent partition of the first and second partitions) was probably due to a syntactical and/or structural problem in the initial failed partition and the exemplary computing system 100 will attempt to more particularly identify those portions of the parent partition that encapsulate erroneous print data.

To accomplish this, and regardless of whether one or both of the first and second partitions 120 failed to RIP, the RIP manager 106 repeats the above described process of splitting each failed partition into respective first and second partitions, assigning substantially unique partition IDs 122 to the two new partitions, and attempting to RIP the two new partitions. RIP'd data 124 corresponding to any of the two new partitions that is/are successfully RIP'd is communicated to the RIP manager. For any of the two new partitions that fail to RIP, this process of splitting, assigning, and RIP'ing is repeated until a failed partition represents some threshold amount of print data (PDL) such as a configurable number of pages of print data.

The threshold amount of print data in a failed partition 120 can be selected based on criteria such as print job size, workflow needs, available RIP resources, and/or the like. For example, in one implementation, the process of splitting, uniquely identifying, and RIP'ing a failed partition 120 is repeated until a failed partition represents less than a single page, a single page, or more than a single page but less than two pages of PDL. Such a value indicating the threshold amount of print data to be represented in a failed partition is stored, for example, in a configuration data portion of other data 140 of FIG. 1.

The RIP manager 106 indicates which partitions 120 failed to RIP in the report 132, which is published for review by an administrative entity. Such publication can take numerous different forms. For instance, the report can be displayed on a display monitor for review (e.g., the display monitor 226 of FIG. 2), the report can be printed, accessed via a Web site, e-mailed to a subscriber base such as an entity associated with the print data source 102, and so on. In this manner, and since the pages of the print data 114 that comprise erroneous data are particularly identified, the administrative entity can quickly locate, edit, and thereby correct those erroneous portions of the print data. Such corrected print data is re-submitted as edited print data 134 to the job server 104.

Responsive to receiving edited print data 134, the job server 104 generates a new print job 116, corresponding partitions of which will be merged into partitions of a pending print job 136. A pending print job remains pending until the edited print data is successfully RIP'd. Numerous techniques can be used to merge partitions of the new print job with a pending print job. For example, in one implementation, the job server presents a user interface (UI) 138 allowing an administrative entity to view each pending print job. In this example the administrative entity selects the pending print job with which to merge the new print job. When dividing the merged print job into respective partitions, the RIP manager assigns partition IDs 122 to the respective partitions such that the assigned partition IDs are synchronized (i.e., substantially unique and properly ordered) with respect to the partition IDs of the pending print job.

Partitions 120 associated with the edited print data 134 are distributed to respective ones of the RIP engines 118 for RIP'ing. If the newly submitted partitions fail to RIP for any reason, the procedures described above are implemented until the corresponding data is successfully RIP'd. As successfully RIP'd data 128 is received by the RIP manager 106, the RIP'd data is forwarded to the data aggregator 110 for aggregation into the output file 126. The data aggregator does not generate the output file until all of the print data 114 and edited print data 134 has been successfully RIP'd.

The data aggregator 110 keeps track of each partition 120 that has been successfully RIP'd by comparing the substantially unique ID indicated by each block of RIP'd data 124, to the list of the partition IDs 122 associated with the pending print job 136. Once all RIP'd data has been received, including RIP'd data representing corrected/edited print data 134, the data aggregator combines the RIP'd data in "sorted order" into the output file 126. Sorted order represents the proper sequential ordering of the respective RIP'd data to represent of the ordering of the print data 114. At this point, the data aggregator communicates the output file to one or more printing device(s) 112 for printing.

The exemplary computing environment 100 should not be interpreted as having any dependency or requirement relating to the distribution or architecture of components as illustrated in FIG. 1. For example, although the job server 104, the RIP manager 106, and the data aggregator 110 are illustrated as separate components, in one implementation, the RIP manager encapsulates one or both of the job server and the data aggregator as shown below in FIG. 2.

Figure 2:
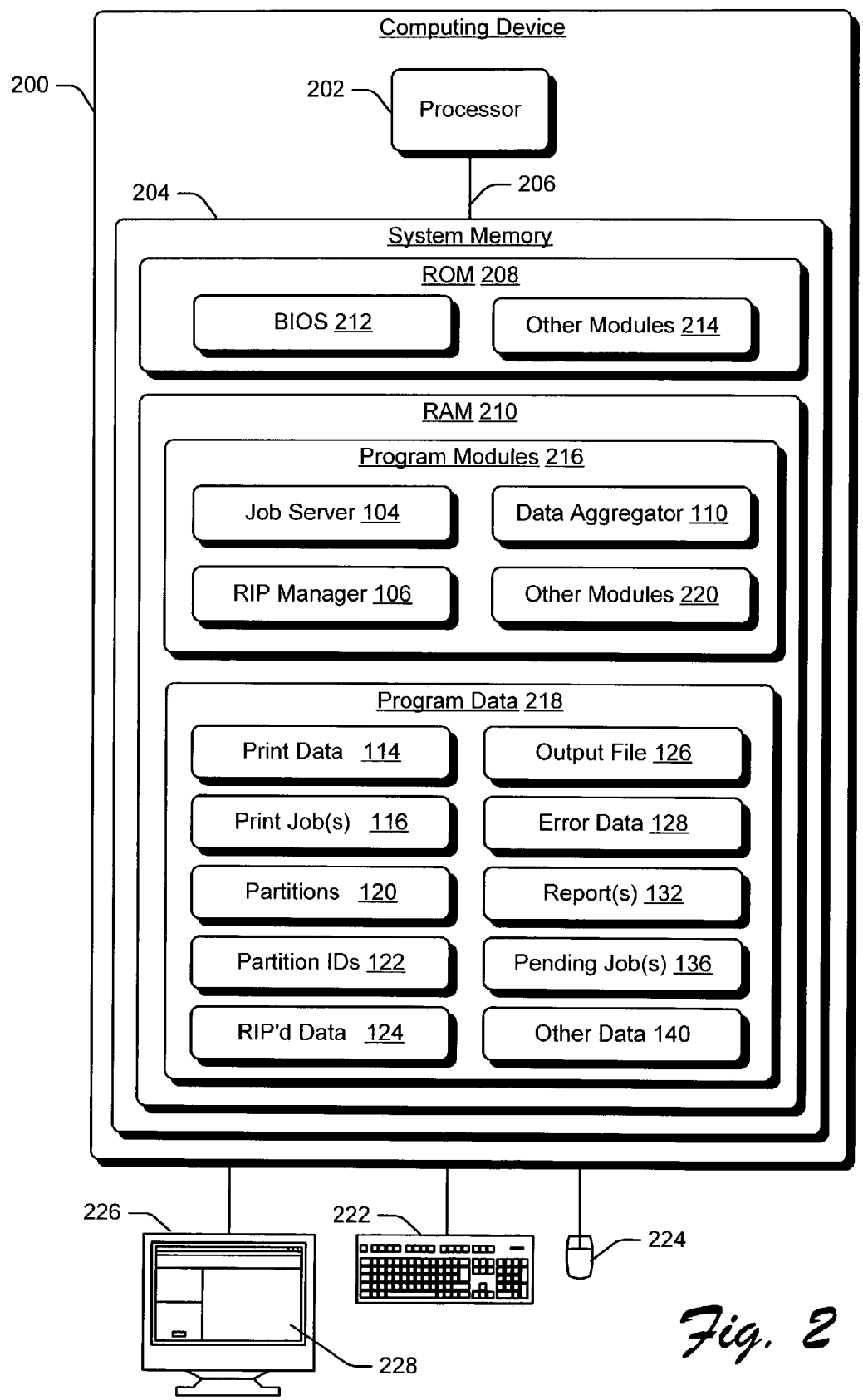
FIG. 2 shows an exemplary computer system to for recovery of a failed to RIP partition.

FIG. 2 shows an exemplary computing device 200 for recovery of a failed RIP partition. Exemplary computing device 200 is only one example of a suitable computing device within which program modules and data to automatically recover a failed RIP partition may be implemented. Thus, computing device 200 is not intended to suggest any limitation as to the scope of use or functionality of systems and methods the described herein. For example, although the program modules 216 and program data 218 are shown in FIG. 2 as being implemented in a single computing device, individual ones and/or combinations of the program modules and data could be implemented across multiple computing devices in a distributed processing computing environment such as that described above in reference to FIG. 1.

The components of computing device 200 include one or more processors 202, system memory 204, and bus 206 that couples various system components including the processor to the system memory. Bus 206 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computing device 200 includes a variety of computer readable media. Such media may be any available media that is accessible by computer 200, and it includes both volatile and non-volatile media, removable and non-removable media. In FIG. 2, system memory 204 includes computer-readable media in the form non-volatile memory, such as read-only memory (ROM) 208, and/or volatile memory, such as random access memory (RAM) 210. A basic input/output system (BIOS) 212 contains basic routines that help to transfer information between elements within computer 200, such as during start-up, is stored in ROM 208 along with other firmware modules 214. Computer 200 may further include other removable/non-removable, volatile/non-volatile computer storage media (not shown) such as a hard disk drive, a CD-ROM, a magnetic tape drive, and so on.

RAM 210 contains program modules 216 and program data 218 that are immediately accessible to and/or presently being operated on by the processor 202. For purposes of discussion, a number of the program modules and data are representative of the program modules and data described above with respect to FIG. 1. To facilitate cross-referencing between FIGS. 1 and 2, the left-most digit of a component's reference number identifies the figure in which the reference number first appears. For instance, program modules 216 includes job server 104, RIP manager 106, data aggregator 110, and other modules 220 such as an operating system (OS) to provide a runtime environment, and so on. Each program module with a reference number that begins with a "1" was described above in reference to FIG. 1 and is also illustrated therein. Along this line, program data 218 includes, for example, uploaded or downloaded print data 114, print job(s) 116, partitions 120, partition IDs 122, RIP'd data 124, output file 126, error data 128, report(s) 132, pending job(s) list 136, and other data 140 such as configuration data, and so on.

A user may provide commands and information into computer 200 through input devices such as keyboard 222 and pointing device 224 (such as a "mouse"). Other input devices (not shown) may include a microphone, joystick, game pad, satellite dish, serial port, scanner, camera, etc. These and other input devices are connected to the processing unit 202 through a user input interface (not shown) that is coupled to bus 206, but may be connected by other interface and bus structures, such as a parallel port, game port, or a universal serial bus (USB).

A monitor 226 or other type of display device is also connected to bus 206 via an interface, such as a video adapter (not shown). UI 138 (FIG. 1) is presented via the monitor or presented via voice activated interfaces, and/or the like. The UI allows an administrative entity to view current and pending print jobs, and to merge partitions of a particular print job 116 with a pending print job 136.

Figure 3:
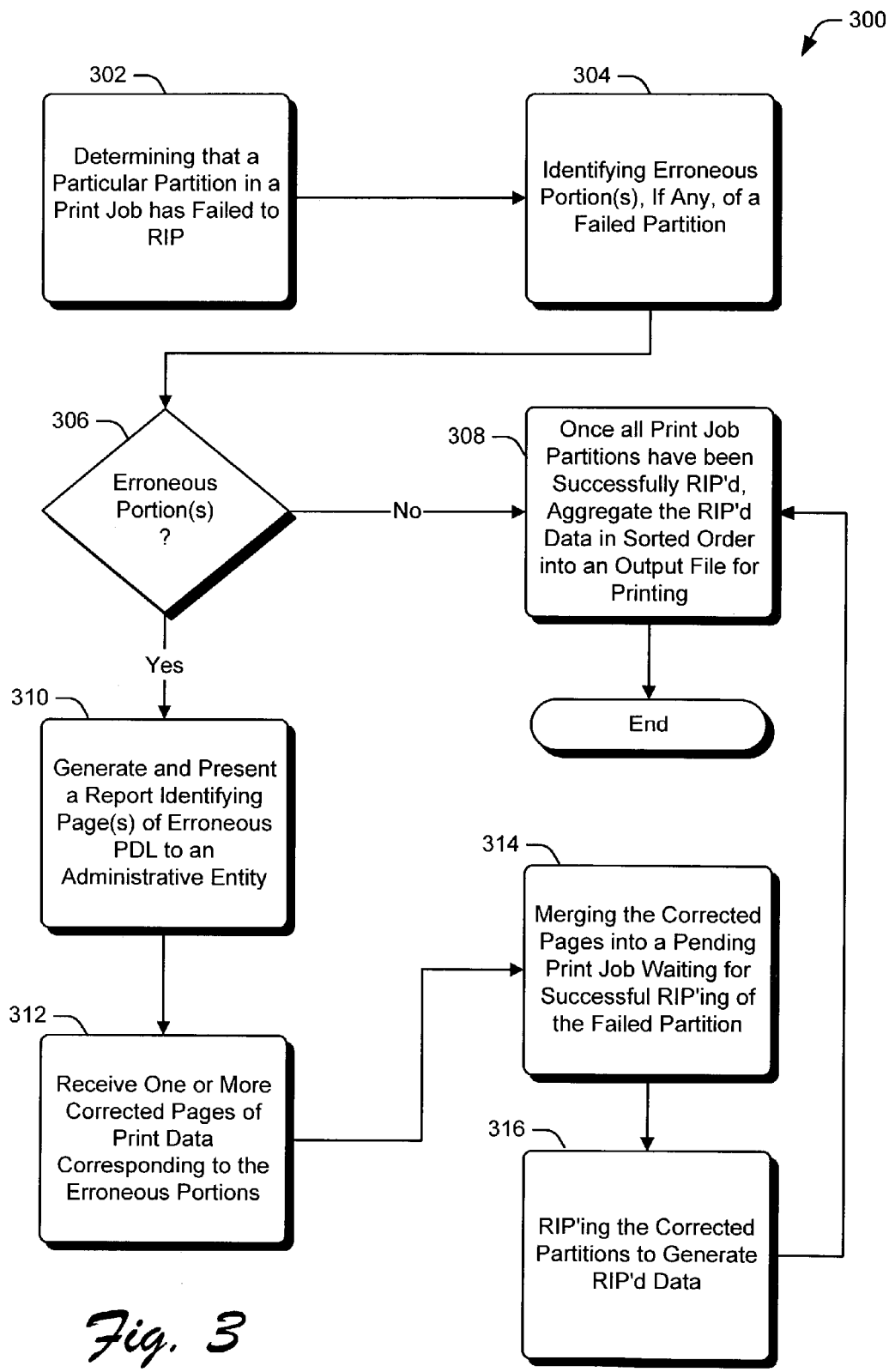
FIG. 3 shows an exemplary procedure to automatically recover a failed RIP partition.

FIG. 3 shows an exemplary procedure 300 to recover a failed RIP partition. For purposes of discussion, the exemplary procedure is described in reference to program module and data components of FIGS. 1 and 2. At block 302, the RIP manager 106 determines that a particular print job partition 120 has failed to RIP. At block 304, the RIP manager identifies one or more erroneous portions, if any, of the failed partition. This is accomplished via an iterative binary search procedure that determines the specific page boundaries of any failed portions of the partition that include syntactical and/or structural errors. At block 306, it is determined whether any erroneous portions were located.

If no erroneous portions were detected at block 306, then the failed partition may have been the result of a temporary or permanent malfunction at a corresponding RIP engine 118. In this case, the failed partition will have been RIP'd to successful completion via the iterative binary search operations of block 304. Thus, the procedure continues at block 308, wherein the data aggregator 110 combines RIP'd data 124 for each of the successfully RIP'd partitions corresponding to the pending print job 136 into the output file 126 for printing at one or more print devices 112.

Otherwise, at block 310, one or more erroneous portions having been identified via the iterative binary search operations of block 304, a report 132 is generated that identifies the one or more pages of the erroneous PDL in the failed partition(s). The report is provided to an administrative entity, for example, via an e-mail indication, a printout, a Web page, and/or the like, so that the entity can efficiently locate and edit the erroneous PDL for re-submitting to the job server 104. At block 312, the job server receives edited print data 134 representing corrected pages of the erroneous PDL portions identified in block 304. The print manager generates a new print job that encapsulates the edited print data.

At block 314, the RIP manager 106 merges new print job 116 into a pending print job 136, the pending print job is waiting until successful RIP'ing of the edit print data 134 before being aggregated into an output file 126 for printing. Such merging is accomplished by synchronizing partition ID(s) 122 corresponding to the edited print data with partition IDs 122 associated with the pending print job. At block 316, the new print job is RIP'd in a pipeline 108 until corresponding print data is successfully RIP'd to RIP'd data 124, as described above in reference to FIGS. 1 and 2. If for some reason the edited print data also contains erroneous portions of print data, those portions are identified as discussed above with respect to blocks 304-316. Otherwise, the procedure continues at block 308, wherein the data aggregator 110 combines RIP'd data 124 for each of the successfully RIP'd partitions corresponding to the pending print job 136 into the output file 126 for printing at one or more print devices 112.

CONCLUSION

The described systems and methods provide for recovery of a failed RIP partition. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. In a raster image processing (RIP'ing) pipeline, a method for recovery of a failed raster image process (RIP) partition, the method comprising:
   distributing multiple partitions of a print job across multiple RIP engines for RIP'ing;
   determining that one or more particular partitions of the multiple partitions has failed to RIP, other ones of the multiple partitions that are not the one or more particular partitions having a first set of raster image processed (RTP'd) data;
   automatically identifying zero (0) or more portions of erroneous print data portions within the one or more particular partitions;
   if one (1) or more portions of erroneous print data are automatically identified:
      recovering edited print data corresponding to the one or more erroneous portions;
      correcting the erroneous partitions manually by an administrative entity;
      generating a second set of RIP'd data corresponding to the edited print data;
      merging second set of RIP'd data into the first set without re-RIP'ing the other ones of the multiple partitions; and
      aggregating the first and second sets of RIP'd data into an output file for printing; and
   if no portions within the one or more particular partitions are erroneous:
      automatically generating a second set of RIP'd data corresponding to the one or more particular partitions; and
      aggregating the first and second sets of RIP'd data into an output file for printing,
   wherein the one (1) or more erroneous portions are each of a configurable number of pages of print data.

2. A method as recited in claim 1, wherein aggregating further comprises sorting the RIP'd data to correspond to an ordering of print data in the print job.

3. A method as recited in claim 1, wherein before distributing the multiple partitions, the method further comprises:
   dividing print data corresponding to the print job into the multiple partitions;
   assigning each partition of the multiple partitions a unique partition identifier (ID); and
   wherein aggregating further comprises ordering the RIP'd data based on each partition's substantially unique ID.

4. A method as recited in claim 1, wherein the one (1) or more erroneous portions are one or more of syntactically and structurally incorrect.

5. A method as recited in claim 1, wherein automatically identifying one or more erroneous portions further comprises performing an iterative binary search of the one or more particular partitions to identify the one or more erroneous portions, in a first iteration, the one or more particular partitions being failed partitions.

6. A method as recited in claim 5, wherein performing an iterative binary search further comprises:
   (a) splitting each of one or more failed partitions into first and second partitions;
   (b) communicating each of the first and second partitions to one of the multiple RIP engines such that any partition of the first and second partitions that fails to RIP comprises a failed partition, a partition of the first and second partitions that is not a failed partition comprising a successfully RIP'd partition;
   for each failed partition that comprises more than a threshold amount of print data, repeating operations of (a) and (b); and
   for each failed partition that does not comprise more than a threshold amount of print data, identifying the failed partition in a report that facilitates administrative location of the one or more erroneous portions.

7. A method as recited in claim 6, wherein the threshold amount is based on one or more of print job size, workflow, and available RIP resources.

8. A method as recited in claim 6, wherein the threshold amount is less than a single page of print data, a single page of print data, or more than a single page of print data.

9. A computer-readable medium comprising computer-program instructions for recovering a failed raster image process (RIP) partition, the computer-program instructions being executable by a processor for:
   dividing print data corresponding to a print job into multiple partitions;
   distributing the multiple partitions across multiple RIP engines for RIP'ing;
   identifying one or more failed partitions the multiple partitions that have not been successfully RIP'd, other partitions of the multiple partitions having been successfully RIP'd, by performing an iterative binary search of the one or more failed partitions to identify one or more erroneous portions, where the one or more erroneous portions each represent a configurable number of pages of print data;
   receiving edited print data corresponding to the one or more failed partitions;
   correcting the failed partitions manually by an administrative entity;
   independent of re-RIP'ing the other partitions, submitting the edited print data to one or more RIP engines; and
   responsive to successfully generating RIP'd data corresponding to the edited print data, combining the RIP'd data with RIP'd data corresponding to the other partitions in sorted order into an output file for printing.

10. A computer-readable medium as recited in claim 9, wherein the instructions for performing an iterative binary search further comprise instructions for:
    (a) splitting each of one or more failed partitions into first and second partitions;
    (b) communicating each of the first and second partitions to one of the multiple RIP engines such that any partition of the first and second partitions that fails to RIP comprises a failed partition, a partition of the first and second partitions that is not a failed partition comprising a successfully RIP'd partition;

for each failed partition that comprises more than a threshold amount of print data, repeating operations of (a) and (b); and for each failed partition that does not comprise more than a threshold amount of print data, identifying the failed partition in a report that facilitates administrative location of the one or more erroneous portions.

11. A computer-readable medium as recited in claim 10, wherein the threshold amount is based on one or more of print job size, workflow, and available RIP resources.

12. A computer-readable medium as recited in claim 10, wherein the threshold amount is less than a single page of print data, a single page of print data, or more than a single page.

13. A computing device for recovering a failed raster image process (RIP) partition, the computing device comprising:
   a processor; and
   a memory coupled to the processor, the memory comprising computer-computer-program instructions executable by a processor for:
   performing an iterative binary search of one or more unsuccessfully RIP'd partitions to identify one or more erroneous portions, the one or more unsuccessfully RIP'd partitions having been submitted to a raster image processing (RIP'ing) pipeline as part of a print job comprising multiple partitions of which the unsuccessfully RIP'd partitions are at least a subset, the iterative binary search performed by:
   (a) splitting each of the unsuccessfully RIP'd partitions into first and second partitions;
   (b) communicating each of the first and second partitions to one of the multiple RIP engines such that any partition of the first and second partitions that fails to RIP comprises an unsuccessfully RIP'd partition, a partition of the first and second partitions that is not a failed partition having corresponding RIP'd data;
   for each unsuccessfully RIP'd partition that comprises more than a threshold amount of print data, repeating operations of (a) and (b); and
   for each unsuccessfully RIP'd partition that does not comprise more than a threshold amount of print data, identifying the failed partition in a report that facilitates administrative location of the one or more erroneous portions;
   receiving edited print data corresponding to the unsuccessfully RIP'd partitions;
   correcting the unsuccessfully RIP'ed partitions manually by an administrative entity;
   without re-submitting any previously successfully RIP'd partitions of the multiple partitions to the pipeline, submitting the edited print data to the pipeline for RIP'ing; and
   responsive to successfully RIP'ing the edited print data, aggregating RIP'd data corresponding to each of the multiple partitions into an output file for printing,
   wherein the threshold amount is based on one or more of print job size, workflow, and available RIP resources.

14. A computing device as recited in claim 13, wherein the one or more erroneous portions each represent a configurable number of pages of print data.

15. A computing device as recited in claim 13, wherein the threshold amount is less than a single page of print data, a single page of print data, or more than a single page.

16. A system for recovery of a failed raster image process (RIP) partition, the system comprising:
   means for distributing multiple partitions of a print job across multiple RIP engines for RIP'ing;
   means for determining that one or more particular partitions of the multiple partitions has failed to RIP to identify one or more erroneous portions within the one or more particular partitions, each erroneous portion representing a configurable number of pages of print data, other ones of the multiple partitions that are not the one or more particular partitions having a first corresponding set of raster image processed (RIP'd) data;
   means for recovering edited print data corresponding to the one or more particular partitions;
   means for correcting the one or more particular partitions manually by an administrative entity;
   means for generating a second set of RIP'd data corresponding to the edited print data;
   means for merging second set of RIP'd data into the first set without re-RIP'ing the other ones of the multiple partitions; and
   means for aggregating merged first and second sets of RIP's data into an output file for printing.

17. A system as recited in claim 16, wherein the means for aggregating further comprises means for sorting the RIP'd data to correspond to an ordering of print data in the print job.

18. A system as recited in claim 16, wherein the means for determining further comprise means for performing an iterative binary search of the one or more particular partitions to identify one or more erroneous portions, in a first iteration, the one or more particular partitions being failed partitions.

19. A system as recited in claim 18, wherein the means for performing an iterative binary search further comprise:
   (a) means for splitting each of one or more failed partitions into first and second partitions;
   (b) means for communicating each of the first and second partitions to one of the multiple RIP engines such that any partition of the first and second partitions that fails to RIP comprises a failed partition, a partition of the first and second partitions that is not a failed partition comprising a successfully RIP'd partition;
   for each failed partition that comprises more than a threshold amount of print data, means for repeating operations of (a) and (b); and
   for each failed partition that does not comprise more than a threshold amount of print data, means for identifying the failed partition in a report that facilitates administrative location of the one or more erroneous portions.

20. A system as recited in claim 19, wherein the threshold amount is based on one or more of print job size, workflow, and available RIP resources.

21. A method as recited in claim 19, wherein the threshold amount is less than a single page of print data, a single page of print data, or more than a single page.

* * * * *

UNITED STATES PATENT AND TRADEMARK OFFICE
CERTIFICATE OF CORRECTION

PATENT NO. : 7,352,481 B2
APPLICATION NO. : 10/394970
DATED : April 1, 2008
INVENTOR(S) : Robert Douglas Christiansen It is certified that error appears in the above-identified patent and that said Letters Patent is hereby corrected as shown below:

Title page, Item (73), in "Assignee", in column 1, line 1, delete "Develepment" and insert -- Development --, therefor.

In column 9, line 33, in Claim 1, delete "(RTP'd)" and insert -- (RIP'd) --, therefor.

In column 10, line 34, in Claim 8, after "page" insert -- but less than two pages --.

In column 11, line 18, in Claim 12, after "page" insert -- but less than two pages of print data --.

In column 11, line 24, in Claim 13, delete "computer-computer-program" and insert -- computer-program --, therefor.

In column 11, line 52, in Claim 13, delete "RIP'ed" and insert -- RIP'd --, therefor.

In column 12, line 63, in Claim 21, after "page" insert -- but less than two pages of print data --.

Signed and Sealed this

Tenth Day of November, 2009

David J. Kappos
*Director of the United States Patent and Trademark Office*